May 29, 1923.
F. B. ROUBIQUE
1,457,230
COMBINED PLANTER AND FERTILIZER DISTRIBUTOR
Filed Jan. 30, 1922      3 Sheets-Sheet 2
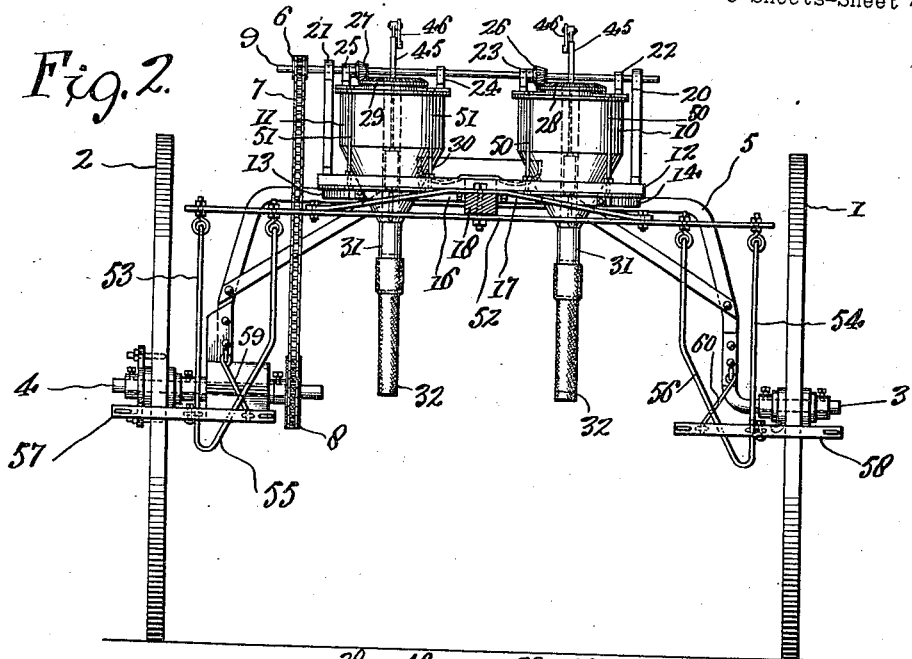
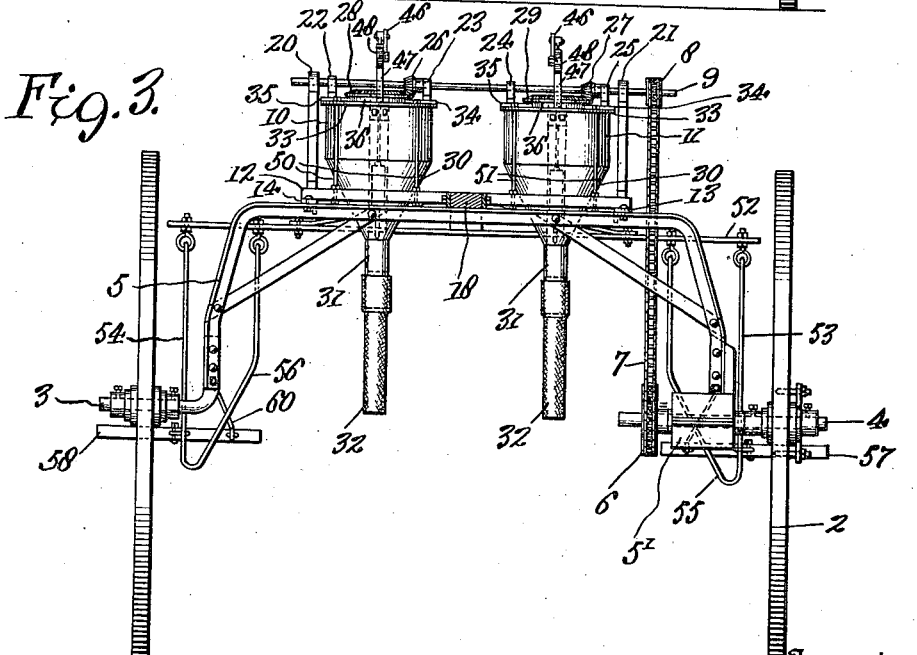
Inventor
Francis B. Roubique
by Wilkinson & Giusta
Attorneys May 29, 1923.

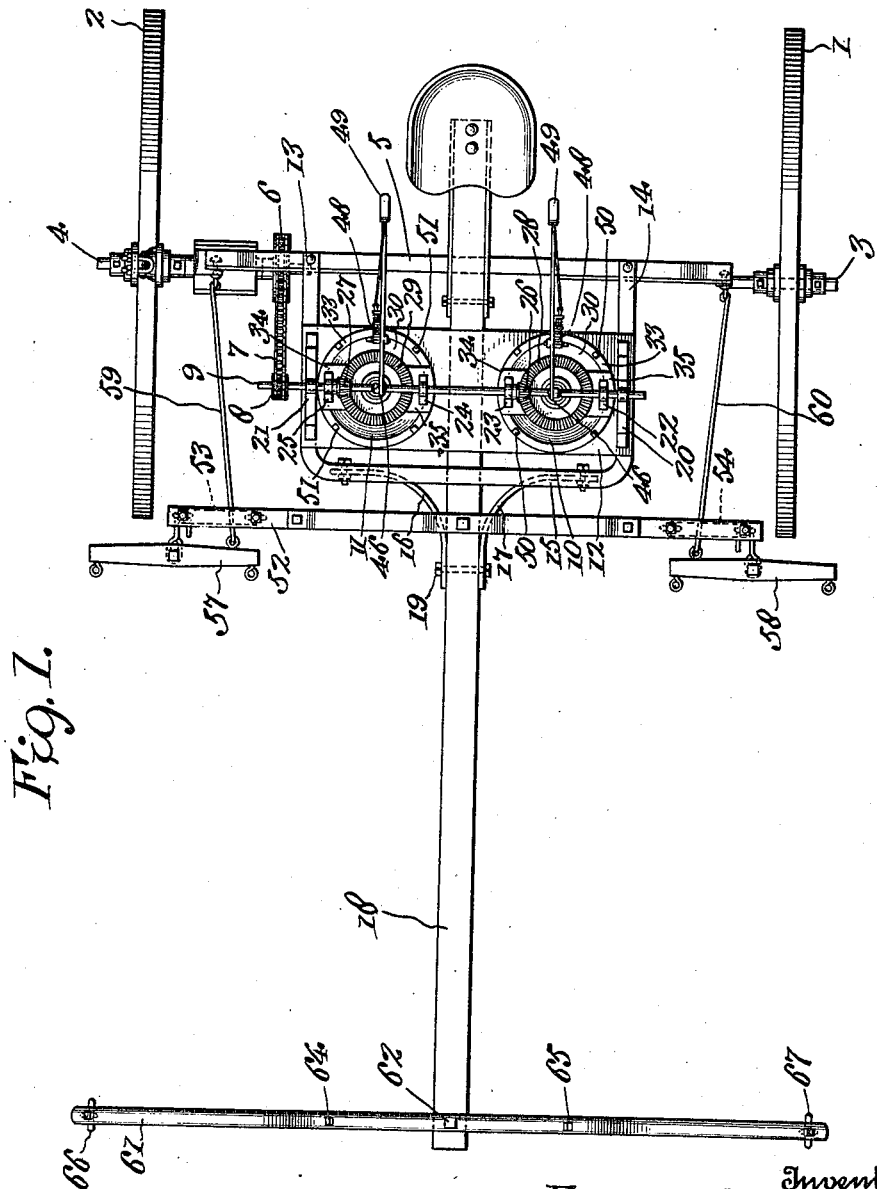

F. B. ROUBIQUE 1,457,230

COMBINED PLANTER AND FERTILIZER DISTRIBUTOR

Filed Jan. 30, 1922   3 Sheets-Sheet 3

Inventor
Francis B. Roubique
by Wilkinson &
Giusta
Attorneys.

Patented May 29, 1923.

1,457,230

UNITED STATES PATENT OFFICE.

FRANCIS B. ROUBIQUE, OF NAPOLEONVILLE, LOUISIANA.

COMBINED PLANTER AND FERTILIZER DISTRIBUTOR.

Application filed January 30, 1922. Serial No. 532,766.

*To all whom it may concern:*

Be it known that I, FRANCIS B. ROUBIQUE, a citizen of the United States, residing at Napoleonville, in the parish of Assumption and State of Louisiana, have invented certain new and useful Improvements in Combined Planter and Fertilizer Distributors; and I do hereby declare the following to be a full, clear, and exact description of the invention, such as will enable others skilled in the art to which it appertains to make and use the same.

The present invention relates to improvements in combined planters and fertilizer distributors and consists more particularly in a machine for the planting of seeds and the distribution of fertilizer between plant rows of corn, cane or other crops.

It is an object of the invention to provide a machine for carrying out the above described functions simply and economically which can be attended by a single farm hand and will have a relatively great capacity for performing this work without hardship upon the attendant.

Another object of the invention is to produce a relatively light machine for the purposes stated which may be readily drawn along by animal power and will at the same time be durable and capable of withstanding the rough uses to which a machine of this kind is subjected in traveling over cultivated fields.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a top plan view of an apparatus constructed according to the present invention;

Fig. 2 is a front elevation of the same with parts in section and certain parts removed;

Fig. 3 is a rear elevation with the seat removed;

Figure 4:
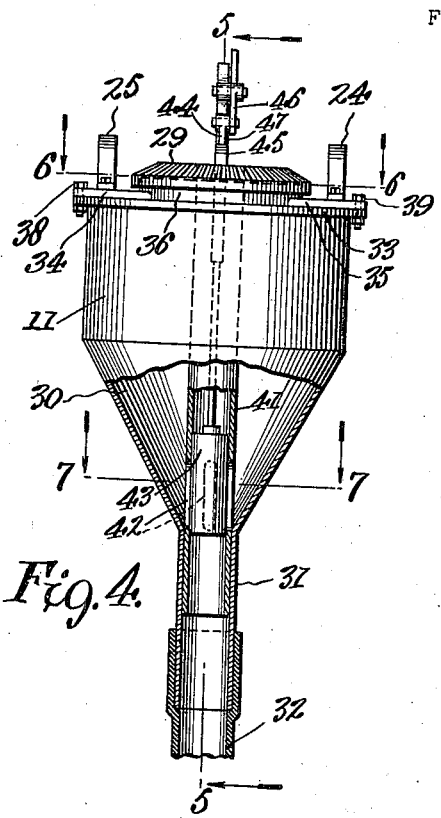
Fig. 4 is an enlarged elevation of the distributing hopper with parts shown in section and parts broken away.

Referring more particularly to the drawings, 1 and 2 designate the ground wheels which are journaled upon the stub shafts 3 and 4 which are carried by the lower ends of the arched axle 5. The arched axle 5 will be sufficiently high to enable the parts carried thereby to clear the tops of plant rows extending from 3 to 5 feet or higher. The stub shaft 4 is longer than the companion shaft and extends inwardly through a hub or box bolted to the arched axle 5' to receive a sprocket 6 for driving the chain 7 meshing therewith.

The chain 7 extends upwardly to a second smaller sprocket 8 fixed upon a shaft 9 extending transversely of the machine and above a pair of companion feed hoppers 10 and 11 which are suitably supported in a beam 12 which has its support in the longitudinally extending arms 13 and 14 of a U-shaped bar 15 which is supported in part by the arched axle 5, and in part by braces 16 and 17 which extend to a tongue 18. The braces 16 and 17 are preferably curved in opposite directions and have portions lying along opposite sides of the tongue 18 and being bolted or otherwise secured thereto as indicated at 19. Considerable portions of the rear part of the braces 16 and 17 also lie in contact with the front portion of the U-shaped bar 15, the bar being preferably of angle iron or channel construction so as to have its flanges lie against edges of the braces and to thus reinforce this combined structure.

The shaft 9 is journaled in standards 20 and 21 erected upon opposite end portions of the beam 12. Suitable hangers 22 and 23 are provided upon the upper edge or rim of the hopper 10 for the shaft 9 while similar hangers 24 and 25 are provided for the shaft upon the rim of the companion hopper 11. The shaft 9 carries beveled pinions 26 and 27 turning therewith and meshing with beveled gear wheels 28 and 29 hereinafter more fully referred to.

Referring more particularly to Figs. 4 to 8 inclusive, each of the hoppers is preferably as herein shown and the description of the hopper 10 referred to will be understood as being equally applicable to the hopper 11.

According to the preferred construction shown, each hopper is provided with a tapered or inverted frusto-conical base 30, the walls of which converge centrally to a cylindrical nozzle 31 extending down for a suitable distance to enable the application thereupon of a flexible eduction tube 32. This eduction tube extends down to within a suitable distance of the plants and may yield in striking the sides of the plants or other obstacles.

The hoppers are adapted to carry seed and fertilizer, which may be loaded into the top parts of the hoppers which are preferably reinforced by outwardly turned rims 33. The hoppers are desirably made of sheet metal although other material may serve the purpose equally well. The hangers 22 and 23 serve as centering devices for the shaft 9 and are supported upon the arms 34 and 35 which carry a central round block 36 adapted to fit within the annular cavity 37 in the base of the beveled gear 28. The arms 34 and 35 are bolted or otherwise secured to the rim 33 as indicated at 38 and 39. The beveled gear wheel 28 is free to rotate upon the block 36 and is held securely against any lateral movement by the flange portions at the opposite sides of the annular recess 37, and the gear wheel is further prevented from escaping from the blocks 36 by the weight of the parts attached thereto.

The central portion of the gear wheel 28 is perforated as represented at 40 to receive the upper threaded end of a hollow barrel 41. The barrel lies centrally through the hopper and has its lower end fitted snugly within the nozzle 31, but being free to rotate therein. Just above the nozzle, the barrel 41 is provided with a number of vertically extending elongated slots 42 to admit the material from the hopper into the nozzle and eduction tube. A plunger 43, also preferably hollow for purposes of lightness, is slidably mounted within the barrel 41 or is slidably movable therein in order to enable it to move past the slots 42 and either totally eclipse the slots or partially mask them according as it may be desirable in order to cut off the supply of said fertilizer or to only reduce the supply.

A stem 44 is secured to the plunger 43 and has a slotted portion 45 adapted to straddle the shaft 9 and to permit of vertical movement which it receives from a hand lever 46 pivoted upon a bracket 47 secured to the hopper or other support and having a latch segment 48 and a latch rod 49 associated therewith to hold the plunger in the adjusted position. The hoppers may be braced by tie rods 50 and 51 which pass between the rim 33 and the beam 12. Also other braces are provided for the parts wherever necessary.

A double-tree 52 is pivotally supported upon the tongue 18 near the U-shaped bar 15 and has at its outer end U-shaped stirrups 53 and 54 extending downwardly and having diagonal side portions 55 and 56. Swingle-trees 57 and 58 are adjustably carried upon the stirrups 53 and 54 and are suitably braced by rods 59 and 60 extending to the axle or other parts of the machine.

A neck yoke 61 is also provided, it being pivotally mounted upon the tongue 18 as represented at 62, and having a brace 63 extending beneath the tongue and also secured by the bolt 62. The brace 63 extends as an arc across the upper arched portion of the neck yoke and has its ends down-turned and secured as by bolts 64 and 65 to the neck yoke. The neck yoke is provided with suitable rings 66 and 67 at its divergent ends for the attachment of the harness.

In operation, the machine is drawn along by draft-animals hitched to the stirrups 53 and swingle-trees 58, although it will be understood that other power, for instance a tractor, may be employed for this purpose. The hoppers are initially loaded with seed and fertilizer and as the machine proceeds the two eduction tubes will lie to opposite sides of the plant rows which are easily cleared by the height of the arched axle. The movement of the machine will cause the sprocket 7 to be put into operation with a consequent turning of the shaft 9 and its pinions 26 and 27. These pinions meshing as they do with the gear wheels 28 and 29 impose a constant rotation upon the barrels 41. There results an agitating effect upon the material which converges into the lower portion of the hopper and as this material is stirred about it readily finds exit through the elongated slots 42 into the nozzle and eduction tubes 32 by which it is directed upon the ground.

Figure 5:
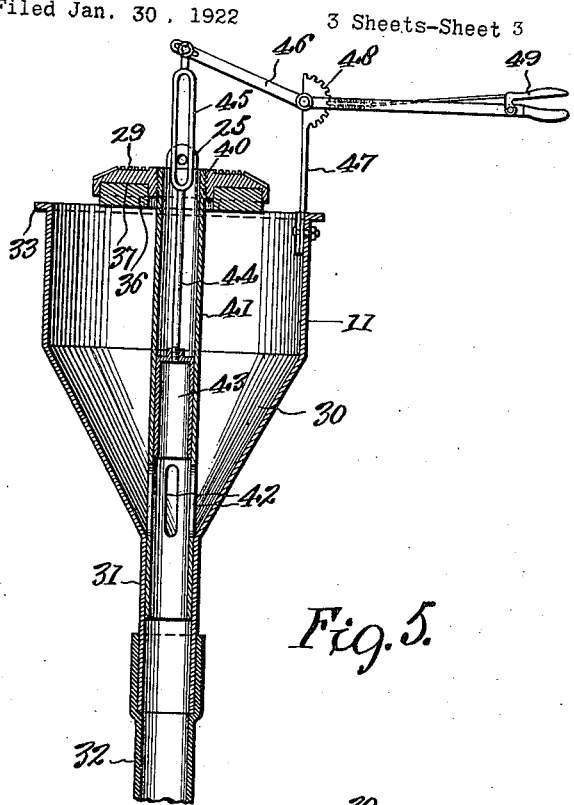
Fig. 5 is a vertical section through the feed hopper taken at right angles to Fig. 4.
Figure 6:
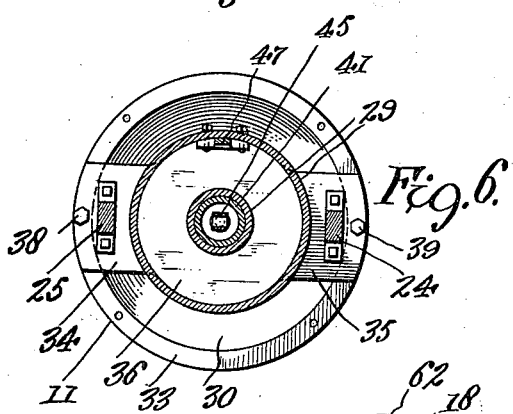
Fig. 6 is a horizontal section taken on the line 6—6 in Fig. 4.
Figure 7:
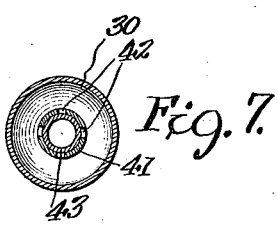
Fig. 7 is a similar view taken on the line 7—7 also in Fig. 4.
Figure 8:
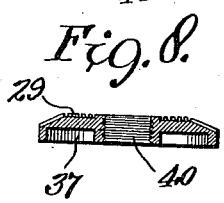
Fig. 8 is a central section through the follower gear.
Figure 9:
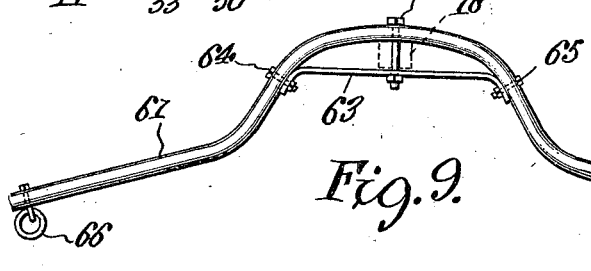
Fig. 9 is a front view of a yoke employed.

The feeding of the material will thus be positive and uniform and the amount permitted to escape is directly under the control of the plungers 43. As shown in Fig. 4, the plungers may be locked to entirely cut off the supply as for instance in going to and returning from the field, or they may be entirely raised as shown in Fig. 5, to allow of a maximum distribution of the seed and fertilizer. Of course it is understood that they may, by adjustment of the levers 46, be caused to assume any intermediate position by which a nice regulation is had.

It will be appreciated from the foregoing that the mechanism is compact and simple and that the machine as a whole is light and easily drawn along and can be inexpensively manufactured, while at the same time providing for a uniform feeding under control of the material.

It is obvious that various changes and modifications may be made in the details of construction and design of the above specifically described embodiment of this invention without departing from the spirit thereof, such changes and modifications being restricted only by the scope of the following claims:

What is claimed is:

1. A machine as described comprising a hopper having an outlet nozzle, a cylindrical barrel fitted through the hopper and nozzle and having its interior in communication with the interior portion of the hopper, means to continuously rotate said barrel, means in the barrel for restricting the flow of the material from the hopper and into the interior of said barrel, and means on the exterior of the hopper for adjusting said means, substantially as described.

2. A machine as described comprising a hopper having a discharge port, a barrel rotatably mounted in said hopper and having its interior in communication with the hopper at its discharging end, a plunger movable axially in said barrel, means to rotate said barrel lying directly above the hopper and adjusting means for the plunger and also mounted above the hopper and being independent of said barrel rotating means, substantially as described.

3. A machine as described comprising a support, a hopper fitted through and sustained by said support, a rotary slotted barrel in said hopper, a gear wheel affixed to the barrel above the hopper, means meshing with said gear wheel to cause rotation of the barrel, and means in the barrel for changing the port area of the slotted portion thereof, substantially as described.

4. A machine as described comprising a platform, hoppers having tapering lower portions fitted through and supported by said platform, outlet nozzles leading from said hoppers, rotary slotted barrels mounted to rotate in said hoppers, means extending in common across the hoppers for simultaneously rotating said barrels, plungers in the barrels cooperating with the slotted portions thereof, and means for adjusting said plungers independently of one another, substantially as described.

5. A machine as described comprising a hopper having a downwardly convergent bottom leading to a central outlet, a hollow slotted barrel rotatably fitted in the hopper, means for rotating said barrel, and a plunger slidable in the barrel and co-operating with the slotted portion thereof to control the outlet of material from said hopper, substantially as described.

6. A machine as described comprising feed hoppers at opposite sides of the longitudinal center of the machine, said feed hoppers having outlet nozzles at the bottoms thereof, barrels rotatably mounted in the hoppers and journaled at their lower end portions in the nozzles, said barrels having slots communicating with the hopper and the nozzle, means to move the barrels in the hoppers, plungers in the barrels adapted to partially or wholly mask the slots, and a latch lever connecting with the plunger and extending on the exterior of the hopper, substantially as described.

FRANCIS B. ROUBIQUE.